(12) United States Patent
Hitomi et al.

(10) Patent No.: US 10,052,845 B2
(45) Date of Patent: Aug. 21, 2018

(54) RESIN COMPOSITE AND METHOD FOR PRODUCING RESIN COMPOSITE

(71) Applicant: SEKISUI PLASTICS CO., LTD., Osaka (JP)

(72) Inventors: Kazutoshi Hitomi, Nara (JP); Yusuke Kuwabara, Nara (JP); Yoichiro Fukunaga, Nara (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 289 days.

(21) Appl. No.: 14/771,664

(22) PCT Filed: Mar. 10, 2015

(86) PCT No.: PCT/JP2015/057048
§ 371 (c)(1),
(2) Date: Aug. 31, 2015

(87) PCT Pub. No.: WO2016/027488
PCT Pub. Date: Feb. 25, 2016

(65) Prior Publication Data
US 2016/0361893 A1    Dec. 15, 2016

(30) Foreign Application Priority Data

Aug. 21, 2014 (JP) ................. 2014-168705

(51) Int. Cl.
*B32B 5/18* (2006.01)
*B32B 5/24* (2006.01)
(Continued)

(52) U.S. Cl.
CPC .............. *B32B 5/18* (2013.01); *B29C 43/203* (2013.01); *B29C 44/20* (2013.01);
(Continued)

(58) Field of Classification Search
CPC .. B32B 5/18; B32B 5/24; B32B 5/245; B32B 5/28; B32B 2250/03; B32B 2250/40;
(Continued)

(56) References Cited

U.S. PATENT DOCUMENTS 3,812,225 A * 5/1974 Hosoda ...................... C08J 9/06
264/236
4,729,917 A * 3/1988 Symdra ................. B29C 51/145
156/212
(Continued)

FOREIGN PATENT DOCUMENTS

CN    101223082 A    7/2008
CN    101668797 A    3/2010
(Continued)

OTHER PUBLICATIONS

European Search Report issued with respect to Application No. 15756539.1, dated Feb. 9, 2017.
(Continued)

*Primary Examiner* — Joanna Pleszczynska
(74) *Attorney, Agent, or Firm* — Greenblum & Bernstein, P.L.C.

(57) ABSTRACT

A resin composite in which the flatness ratio of cells in a corner section of a core material is 20% or more is provided.

5 Claims, 7 Drawing Sheets

(51) Int. Cl.

| | | |
|---|---|---|
| B32B 5/28 | (2006.01) | |
| B29C 43/18 | (2006.01) | |
| B29C 51/14 | (2006.01) | |
| B29C 44/20 | (2006.01) | |
| B29C 47/00 | (2006.01) | |
| B32B 27/36 | (2006.01) | |
| B32B 27/06 | (2006.01) | |
| B32B 27/38 | (2006.01) | |
| B29C 70/46 | (2006.01) | |
| B29C 43/20 | (2006.01) | |
| B29K 67/00 | (2006.01) | |
| B29K 105/04 | (2006.01) | |
| B29K 63/00 | (2006.01) | |
| B29K 105/08 | (2006.01) | |
| B29L 31/30 | (2006.01) | |
| B29C 47/02 | (2006.01) | |
| B32B 5/02 | (2006.01) | |
| B32B 5/14 | (2006.01) | |
| B32B 5/16 | (2006.01) | |
| B32B 5/30 | (2006.01) | |
| B32B 7/12 | (2006.01) | |
| B32B 27/12 | (2006.01) | |
| B32B 27/32 | (2006.01) | |
| B32B 1/00 | (2006.01) | |
| B32B 3/06 | (2006.01) | |
| B29C 33/68 | (2006.01) | |

(52) U.S. Cl.
CPC .......... *B29C 47/0066* (2013.01); *B29C 70/46* (2013.01); *B32B 27/065* (2013.01); *B32B 27/36* (2013.01); *B32B 27/38* (2013.01); *B29C 33/68* (2013.01); *B29C 47/02* (2013.01); *B29C 51/14* (2013.01); *B29C 2793/009* (2013.01); *B29C 2793/0036* (2013.01); *B29K 2063/00* (2013.01); *B29K 2067/003* (2013.01); *B29K 2105/04* (2013.01); *B29K 2105/08* (2013.01); *B29K 2105/089* (2013.01); *B29L 2031/30* (2013.01); *B32B 1/00* (2013.01); *B32B 3/06* (2013.01); *B32B 5/022* (2013.01); *B32B 5/024* (2013.01); *B32B 5/026* (2013.01); *B32B 5/142* (2013.01); *B32B 5/16* (2013.01); *B32B 5/245* (2013.01); *B32B 5/30* (2013.01); *B32B 7/12* (2013.01); *B32B 27/12* (2013.01); *B32B 27/322* (2013.01); *B32B 2250/03* (2013.01); *B32B 2250/40* (2013.01); *B32B 2260/021* (2013.01); *B32B 2260/046* (2013.01); *B32B 2262/0269* (2013.01); *B32B 2262/101* (2013.01); *B32B 2262/106* (2013.01); *B32B 2264/0257* (2013.01); *B32B 2264/102* (2013.01); *B32B 2266/0228* (2013.01); *B32B 2266/0242* (2013.01); *B32B 2266/0264* (2013.01); *B32B 2307/306* (2013.01); *B32B 2307/54* (2013.01); *B32B 2307/542* (2013.01); *B32B 2307/558* (2013.01); *B32B 2307/714* (2013.01); *B32B 2307/72* (2013.01); *B32B 2307/732* (2013.01); *B32B 2307/738* (2013.01); *B32B 2605/00* (2013.01); *B32B 2605/08* (2013.01)

(58) Field of Classification Search
CPC ......... B32B 5/022; B32B 5/024; B32B 5/026; B32B 5/142; Y10T 428/233; Y10T 428/24496; Y10T 428/24504; B29C 43/18; B29C 51/14; B29C 43/203
USPC ...................................................... 428/304.4
See application file for complete search history.

(56) References Cited

U.S. PATENT DOCUMENTS

| | | | |
|---|---|---|---|
| 5,043,127 A * | 8/1991 | Brambach | ................ B32B 5/18 |
| | | | 264/257 |
| 5,075,162 A | 12/1991 | Okubo et al. | |
| 2009/0026198 A1 | 1/2009 | Ichikawa et al. | |
| 2010/0080979 A1 | 4/2010 | Kanamitsu et al. | |
| 2013/0149480 A1 | 6/2013 | Ichikawa et al. | |
| 2016/0332768 A1 | 11/2016 | Ichikawa et al. | |

FOREIGN PATENT DOCUMENTS

| | | |
|---|---|---|
| EP | 2143753 A1 | 1/2010 |
| JP | H07-9462 A | 1/1995 |
| JP | H08-150629 A | 6/1996 |
| JP | H09-156008 A | 6/1997 |
| JP | H09-314713 A | 12/1997 |
| JP | 2013-213104 A | 10/2013 |
| JP | 2014-080022 A | 5/2014 |
| WO | 2007/007867 A1 | 1/2007 |

OTHER PUBLICATIONS

Chinese Office Action issued with respect to Application No. 201580000859.5, dated Feb. 28, 2017.
International Search Report issued with respect to Application No. PCT/JP2015/057048, dated Jun. 9, 2015.
International Preliminary Report on Patentability issued with respect to Application No. PCT/JP2015/057048, dated Feb. 21, 2017.

* cited by examiner

RESIN COMPOSITE AND METHOD FOR PRODUCING RESIN COMPOSITE

CROSS-REFERENCE TO RELATED APPLICATIONS

The present application claims priority on Japanese Patent Application No. 2014-168705, the content of which is incorporated herein by reference.

TECHNICAL FIELD

The present invention relates to a resin composite and a method for producing the resin composite.

BACKGROUND TECHNOLOGY

In recent years, demand is increasing for fiber-reinforced resin materials called FRPs or the like since such are lightweight and have high mechanical strength.

The demand for the fiber-reinforced resin materials is particularly increasing in the automobile field, the shipping field, the aviation field, and the like.

Among these transportation equipment such as automobiles, ships, and aircraft, in particularly the automobile field, it is strongly desired that the constitutional members thereof are light weight and having high strength.

From such background, forming a part of an automobile by a resin composite in which a core material, which has been formed from a resin expanded body, is covered with a fiber-reinforced resin material has been suggested.

From this resin composite forming a fiber-reinforced resin layer having superior strength in the surface section by the fiber-reinforced resin material and exhibiting superior lightweight properties by the core material, using in members such as roofs, bonnets, fenders, and undercovers of automobiles can be considered.

Regarding such resin composite, the below-mentioned Patent Document 1 discloses a resin composite in which a sheet-like fiber-reinforced resin material (fiber-reinforced resin sheet) and a thermoplastic resin expanded body are integrally laminated.

PRIOR ART DOCUMENTS

Patent Documents

Patent Document 1: Japanese Unexamined Patent Application, First Publication No. H09-314713

SUMMARY OF THE INVENTION

Problem to be Solved by the Invention

It is easy for added stress to concentrate in specific places in the resin composite when the core material is not simply plate-like or the like, but has a three-dimensional shape.

For example, in a resin composite having a tray shape including a bottom surface section and a side wall section rising up by spreading outward from the outer edge of the bottom surface section, it is easy for stress concentration to occur in the interface part between the bottom surface section and the side wall section, and, in particular, it is easy for stress concentration to occur in the corner part on the inner side.

For this reason, in order to make a resin composite or transportation equipment constitution members using the resin composite have superior strength, it is effective to carry out measures in advance against stress concentration to such part.

However, conventionally, regarding the local concentration of stress added to a resin composite was not focused on, and it is the situation where almost nothing has been carried out regarding measures for this stress concentration.

Thus, the present invention has the object of providing a resin composite in which such aforementioned measures have been carried out.

Means for Solving the Problem

The inventors of the present invention, as a result of carrying out earnest research in order to achieve the aforementioned object, found that stress concentration easily occurs in corner section in which one site and another site on the surface in a core material having a three-dimensional shape are adjoined at an inner angle of less than 180 degrees and that by adjusting the cell shape in this corner section to a given state, it becomes an effective measure for the stress concentration, thus leading to completion of the present invention.

That is, in order to achieve the aforementioned object, the present invention provides a resin composite comprising: a core material comprising a resin expanded body; and a fiber-reinforced resin material comprising a resin and fibers, the surface of the core material being covered by the fiber-reinforced resin material, wherein the core material is provided with a corner section, one site and another site in the surface adjoin each other at an inner angle of less than 180 degrees via the corner section, and the core material has a flatness ratio of cells from a surface of said corner section to a depth of 2.5 mm of 20% or more.

Furthermore, a method for producing a resin composite, the method being for producing a resin composite comprising: a core material comprising a resin expanded body; and a fiber-reinforced resin material comprising a resin and fibers, a surface of the core material being covered by the fiber-reinforced resin material, wherein the core material of the produced resin composite is provided with a corner section, the core material is provided with a corner section in which one site and another site adjoin each other at an inner angle of less than 180 degrees in a surface covered by the fiber-reinforced resin material, a first step of producing a pre-molded article by laminating the fiber-reinforced resin material on the surface of the core material and a second step of thermobonding the core material and the fiber-reinforced resin material by pressurizing with a molding die said pre-molded article in a heated state are carried out, a core material including a blowing agent in at least the sites becoming the corner section is used in the second step, and the size of cells in the sites of the core material is increased by the second step, and the core material has a flatness ratio of cells from a surface of the corner section to a depth of 2.5 mm of 20% or more is provided.

Effects of the Invention

The resin composite of the present invention, from having a constitution like mentioned above, has superior mechanical strength. Also, by the method for producing a resin composite of the present invention, a resin composite having superior mechanical strength can be produced.

BEST MODE FOR CARRYING OUT THE INVENTION

Hereinafter, embodiments of the present invention are explained.

The resin composite of the present invention includes: a core material comprising a resin expanded body; and a fiber-reinforced resin material comprising a resin and fibers, wherein a surface of the core material is covered by the fiber-reinforced resin material so as to form a fiber-reinforced resin layer.

In addition, hereinafter, "fiber-reinforced resin layer" is also referred to as "FRP layer".

Herein, as the core material, for example, a resin expanded sheet (hereinafter, also referred to as simply "expanded sheet") formed by an extrusion method, a molded article formed by thermoforming the resin expanded sheet, or a bead expanded molded article formed by in-die molding resin expanded beads can be mentioned.

Firstly, the first embodiment of present invention is explained, as an example, when using an expanded article formed by thermoforming an expanded sheet as the core material.

(First Embodiment)

Figure 1A:
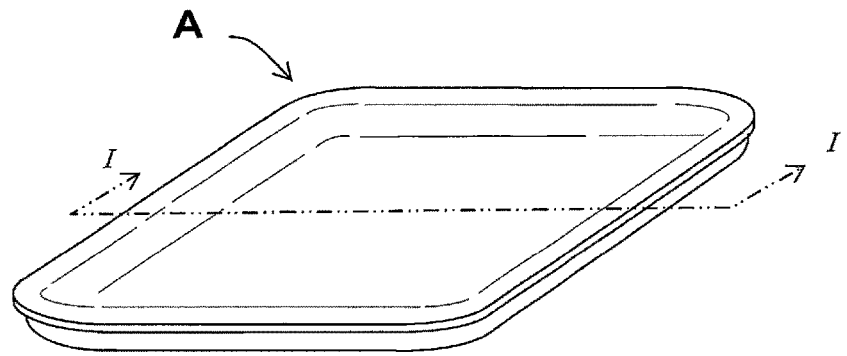
FIG. 1A is a schematic perspective view showing the resin composite of the first embodiment.
Figure 1B:
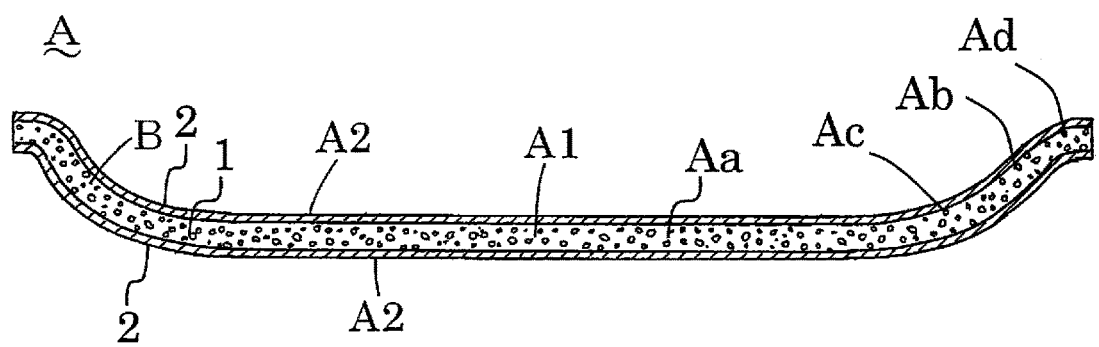
FIG. 1B is a schematic cross-sectional view showing the resin composite of the first embodiment.
Figure 1C:
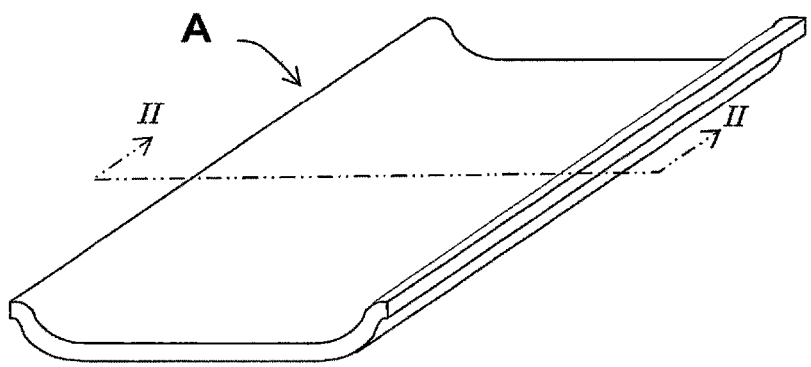
FIG. 1C is a schematic perspective view showing a modified example of the resin composite.

FIG. 1A is a schematic perspective view showing the resin composite according to the first embodiment and FIG. 1B is a schematic cross-sectional view. FIG. 1C is a schematic perspective view showing a modified example thereof.

The cross-sectional view (FIG. 1B) shows the state of the cross-sectional view taken in the arrow direction along the line I-I of the perspective view (FIG. 1A).

As shown in the drawings, a core material A1 of a resin composite A is formed from an expanded sheet 1.

Regarding the resin composite A of the present embodiment, the contour shape is roughly square-shaped in planar view and has a square-shaped contour shape with roundness at the four corner sections.

Also, the resin composite A is provided with a side wall section in the form of enclosing the outer periphery in planar view.

The resin composite A has the side wall section in a form rising upwards and extending outwards from the outer periphery of a square-shaped bottom surface section slightly smaller than the contour shape.

Accordingly, the resin composite A according to the present embodiment, to put it another way, has a shallow square tray shape.

In addition, hereinafter, the depth direction of FIG. 1A is referred to as the length direction and the side direction of FIG. 1A is referred to as the width direction.

The core material A1 has roughly the same shape as the composite resin A and has a shape that is a little thinner than the thickness of the resin composite A.

That is, the core material A1 has a bottom surface section As that is roughly horizontal when the resin composite A is in a state of being placed flat and has a side wall section Ab rising up and extending outwards by a given angle of elevation from the outer peripheral edge of the bottom surface section Aa.

Accordingly, the core material A1 is provided with a corner section Ac in which the surface of the bottom surface section Aa and the surface of the side wall section Ab adjoin at an inner angle of less than 180 degrees.

That is, in the core material A1 of the present embodiment, the two sites of the site forming the bottom surface section Aa and the site forming the side wall section Ab are adjoined via the corner section Ac.

Also, in the resin composite A of the present embodiment, the core material A1 is provided with a brim section Ad extending for a short distance in the outer direction from the top edge of the side wall section Ab.

In addition, in the resin composite A shown in FIG. 1A, FRP layers A2, A2 are laminated on both surfaces of the core material A1 and roughly the entire surface of the core material A1, other than on the outside end surface of the brim section Ad, is covered by a fiber-reinforced resin material.

In addition, the resin composite A of the present embodiment may be provided with the FRP layer A2 on only one surface of the core material A1.

Also, in the modified example of the resin composite A of the present embodiment, the contour shape in planar view is not square and can be made various shapes such as other polygonal shapes, circular, elliptical, semicircular, crescent-shaped, and amorphous.

The resin composite A of the modified example shown in FIG. 1C has a rectangular contour shape in planar view and has a tray shape having a side wall section formed along the long side of the rectangular shape.

However, the resin composite A of this modified example, different to that exemplified in FIG. 1A, is not provided with the side wall section in the form of enclosing the outer periphery and a side wall section is not formed in the site along the short side.

That is, the resin composite A of this modified example has a shallow gutter shape.

In addition, hereinafter, the direction along the long side of the rectangular shape (depth direction in FIG. 1C) is referred to as the length direction and the direction along the short side (side direction in FIG. 1C) is referred to as the width direction.

Also, the resin composite A according to this modified example is formed so to have a cross-sectional shape (cross-sectional view taken in the arrow direction along the line II-II of FIG. 1C) when cut along the width direction thereof similar to the shape shown in FIG. 1B.

The core material A1 of this modified example has roughly the same shape as the resin composite A and has a shape that is a little thinner than the thickness of the resin composite A.

That is, the core material A1 has a bottom surface section Aa that is roughly horizontal when the resin composite A is in a state of being placed flat and has a side wall section Ab rising up and extending outwards by a given angle of elevation from both end sections in the width direction of the bottom surface section Aa.

Accordingly, in the core material A1, the surface of the bottom surface section As and the surface of the side wall section Ab adjoin at an inner angle of less than 180 degrees, and the corner section Ac is provided along these interface regions.

That is, in the core material A1 of the present embodiment, the two sites of the site forming the bottom surface section As and the site forming the side wall section Ab are adjoined via the corner section Ac.

On the other hand, in both end sections in the length direction of the bottom surface section Aa, since the side wall section is not formed, a corner section is not formed.

In addition, the resin composite A of this modified example is the same as that exemplified in FIG. 1A on the point of the core material A1 being providing with the brim section Ad extending for a short distance in the outer direction from the top edge of the side wall section Ab.

The resin composite A according to this modified example is the same as that exemplified in FIG. 1A on the point that the FRP layers A2, A2 are laminated on both sides of the core material A1.

The resin composite A of this modified example is the same as that exemplified in FIG. 1A on the point that roughly the entire surface of the core material A1, other than on the outside end surface of the brim section Ad, is covered by the fiber-reinforced resin material.

Also, the resin composite A of this modified example is the same as that exemplified in FIG. 1A on the point that the FRP layer A2 may be provided on only one surface of the core material A1.

In addition, the resin composite A with an expanded sheet as the core material, is not only a tray shape like exemplified above, but may also be, for example, a shape in which a flat sheet has been folded, a shape in which a plurality of linear corner sections has been arranged in parallel so that the entirety becomes step-like.

The expanded sheet 1 is not particular limited so long as, for example, a three-dimensional shape can be made by thermoforming or the like.

As the resin forming the expanded sheet, there are no particular limitations, and, for example, a polycarbonate resin, an acrylic-based resin, a thermoplastic polyester resin, a polyphenylene ether-based resin, a polymethacrylic imide resin, a polyolefin-based resin, a polystyrene-based resin, and the like can be mentioned.

The resin forming the expanded sheet preferably has superior affinity with the resin forming the FRP layer A2.

Accordingly, from among those previous exemplified, resins showing superior affinity between many types of resins are preferable as the resin forming the expanded sheet, and the resin is preferably a thermoplastic polyester resin, a polystyrene-based resin, an acrylic-based resin, a polyphenylene ether-based resin, and the like.

In addition, it is not necessary for the expanded sheet to be formed from a single type of resin, and may be formed by a mixed resin including two or more types of resins.

As the thermoplastic polyester resin, normally, a linear polyester obtained as a result of carrying out a condensation reaction between a dicarboxylic acid and a divalent alcohol can be used.

As the thermoplastic polyester resin, for example, an aromatic polyester resin and an aliphatic polyester resin can be mentioned.

The aromatic polyester resin is a polyester including an aromatic dicarboxylic acid unit and a diol unit.

As the aromatic polyester resin, for example, polyethylene terephthalate, polypropylene terephthalate, polybutylene terephthalate, polycyclohexane dimethylene terephthalate, polyethylene naphthalate, polybutylene naphthalate, and the like can be mentioned.

The aromatic polyester resin forming the expanded sheet is preferably polyethylene terephthalate.

In addition, the expanded sheet may include one type of aromatic polyester resin or may include two or more types of aromatic polyester resins.

In addition, the expanded sheet may be formed from an aromatic polyester resin containing, other than having an aromatic dicarboxylic acid unit and a diol unit, for example, a trivalent or higher multivalent carboxylic acid such as a tricarboxylic acid such as trimellitic acid and a tetracarboxylic acid such as pyromellitic acid, or an anhydride thereof, a trivalent or higher multivalent alcohol such as a triol such as glycerin and a tetraol such a pentaerythritol as constitutional units.

Also, the expanded sheet may be formed from an aromatic polyester resin (recycled material) formed by collecting and regenerating used PET bottles and/or the like.

The polyethylene terephthalate contained in the expanded sheet may be cross-linked by a cross-linking agent.

As the crosslinking agent, known cross-linking agents can be used, and, for example, an acid dianhydride such as pyromellitic anhydride; a multi-functional epoxy compound; an oxazoline compound; an oxazine compound; and the like can be mentioned.

In addition, the crosslinking agent may be used alone, or two or more types may be combined.

As the aliphatic polyester resin, for example, a polylactic acid-based resin can be mentioned.

As the polylactic acid-based resin, a resin in which the lactic acid is polymerized by ester bonding can be used. From the viewpoints of ease of commercial acquisition and imparting expandability to the polylactic acid-based resin expanded particles, a copolymer of D-lactic acid (D body) and L-lactic acid (L body); a homopolymer of either D-lactic acid or L-lactic acid; and one or more lactide ring-opened polymers selected from the group consisting of D-lactide, L-lactide, and DL-lactide is preferable.

In addition, the aliphatic polyester resin used to form the expanded sheet may be one type alone, or may be two or more types.

Also, the expanded sheet may include one or more types of aromatic polyester resins and one or more types of aliphatic polyester resins.

The polylactic acid-based resin, as monomer components other than lactic acid, may contain, for example, an aliphatic hydroxyl carboxylic acid such as glycolic acid, hydroxybutyric acid, hydroxyvaleric acid, hydroxycaproic acid, hydroxyheptanoic acid; an aliphatic polycarboxylic acid such as succinic acid, adipic acid, suberic acid, sebacic acid, dodecanedicarboxylic acid, succinic anhydride, adipic anhydride, trimesic acid, propane tricarboxylic acid, pyromellitic acid, and pyromellitic anhydride; an aliphatic polyalcohol such as ethylene glycol, 1,4-butanediol, 1,6-hexanediol, 1,4-cyclohexanedimethanol, neopentyl glycol, decamethylene glycol, glycerin, trimethylol propane, and pentaerythritol.

The polylactic based-resin may contain another functional group such as an alkyl group, a vinyl group, a carbonyl group, an aromatic group, an ester group, an ether group, an aldehyde group, an amino group, a nitrile group, and a nitro group.

The polylactic based-resin does not need to be cross-linked by an isocyanate-based cross-linking agent, and may be bonded by bonds other than eater bonds.

As the polyphenylene ether-based resin, for example, poly(2,6-dimethylphenylene-1,4-ether), poly(2,6-diethylphenylene-1,4-ether), poly(2,6-dichlorophenylene-1,4-ether), poly(2,6-dibromophenylene-1,4-ether), poly(2-methyl-6-ethylphenylene-1,4-ether), poly(2-chloro-6-methylphenylene-1,4-ether), poly(2-methyl-6-isopropylphenylene-1,4-ether), poly(2,6-di-n-propylphenylene-1,4-ether), poly(2-bromo-6-methylphenylene-1,4-ether), poly(2-chloro-6-bromophenylene-1,4-ether), poly(2-chloro-6-ethylphenylene-1,4-ether), and the like can be mentioned. As the degree of polymerization of the polyphenylene ether based resin, normally, 10 to 5,000 is used.

If expanded sheet produced by an acrylic-based resin is used, as the acrylic-based resin, an acrylic-based resin obtained by polymerizing a (meth)acrylic-based monomer can be used.

In addition, (meth)acryl means either one or both of acryl and methacryl.

The (meth)acrylic-based monomer to become the constitutional unit of the acrylic-based resin is not particularly limited, and, for example, (meth)acrylic acid, methyl (meth)acrylate, ethyl (meth)acrylate, butyl (meth)acrylate, lauryl (meth)acrylate, 2-ethylhexyl (meth)acrylate, cyclohexyl (meth)acrylate, benzyl (meth)acrylate, (meth)acrylamide, and the like can be mentioned.

Also, the acrylic-based resin, other than the aforementioned (meth)acrylic-based monomer, may contain a monomer component copolymerizable with this (meth)acrylic-based monomer.

As such monomer, maleic acid, maleic anhydride, fumaric acid, itaconic acid, itaconic anhydride, crotonic acid, maleic amide, maleic imide, and the like can be mentioned.

If an expanded sheet produced by a polystyrene-based resin is used, there are no particular limitations as the polystyrene-based resin, and, for example, a homopolymer or copolymer including, as a monomer unit, a styrene-based monomer such as styrene, methylstyrene, ethylstyrene, i-propyletyrene, dimethylatyrene, chlorostyrene, and bromostyrene; a copolymer including a styrene-based monomer and one, or two or more vinyl monomers copolymerizable with this styrene-based monomer as monomer units; and the like can be mentioned.

In addition, as the polystyrene-based resin, a copolymer including a styrene-based monomer and one, or two or more vinyl monomers copolymerizable with this styrene-based monomer as constitutional units is preferable, and a copolymer including methacrylic acid and/or methyl methacrylate, and a styrene-based monomer as constitutional units is more preferable.

In addition, the expanded sheet may include two or more types of polystyrene-based resins.

As the vinyl monomer copolymerizable with the styrene-based resin, for example, an acrylic-based monomer such as acrylonitrile, methacrylonitrile, acrylic acid, methacrylic acid, an acrylic acid ester (methyl acrylate, ethyl acrylate, butyl acrylate, and the like), a methacrylic acid ester (methyl methacrylate, ethyl methacrylate, butyl methacrylate, and the like); maleic acid anhydride; acrylamide; and the like can be mentioned.

Among these, as the vinyl monomer copolymerizable with the styrene-based resin, an acrylic-based monomer is preferable.

As the polystyrene-based resin, that including methacrylic acid or methyl methacrylate is more preferable.

Regarding the core material A1 of the present embodiment, the aforementioned expanded sheet 1 is formed by thermosetting and has a three-dimensional shape.

The core material A1 of the present embodiment, for example, may be shaped in advance before lamination with the fiber-reinforced resin material or may be shaped together with the fiber-reinforced resin material after lamination with the fiber-reinforced resin material.

As the thermosetting for imparting the three-dimensional shape to the core material A1, a known method can be used, and, for example, a vacuum molding method, a pressure molding method, a compression molding method, and the like can be mentioned.

The resin composite A of the present embodiment has a flatness ratio of the cells in the region from the surface of the corner section Ac to a depth of 2.5 mm of 20% or more.

Also, in the resin composite A of the present embodiment, the thickness of the core material A1 in the corner section Ac is thicker than bottom surface section Aa and the side wall section Ab adjoined via the corner section Ac.

In normal expanded sheets and bead expanded molded articles, the cells near the surface are flat cells extended for a long disclosed in a direction parallel with the surface and normally, the flatness ratio is 20% or less.

Also, in normal production methods of resin composites, this flatness ratio is further reduced since the core material shrinks when integrally laminated with the fiber-reinforced resin material.

In contrast, the resin composite A of the present embodiment, as mentioned below, is formed by using an expanded sheet in which a blowing agent is included at least in the sites to become the corner section.

The resin composite A of the present embodiment, so as not to add excessive pressure on the sites to become the corner section, is produced by integrally laminating the expanded sheet and the fiber-reinforced resin material.

Also, the resin composite A of the present embodiment, by not adding excessive pressure to the sites including the blowing agent at the time of production, the size of the cells in such sites is increased.

That is, in the corner section of the core material, the cells grow in the thickness direction more than when in the state of the expanded sheet before molding.

In the core material A1 in the resin composite A of the present embodiment, the cells near the surface of the corner section have a flatness ratio of 20% or more.

If stress is added to the resin composite A, the corner section Ac, in a form in which deformation occurs in the direction of the side wall section Ab falling down with respect to the bottom surface section Aa or in the direction of the side wall section Ab rising up with respect to the bottom surface section Aa, is a place where stress concentration easily occurs.

That is, the corner section Ac, for example, if stress is added in the direction of the side wall section Ab rising up, as a result of the inside FRP layer A2 being deformed in the bending direction, is a place in which stress in the form of being compressed from the inside towards the outside is easily received.

Also, the corner section Ac, if stress is added in the direction in which the side wall section Ab falls down, is a place that easily receives stress in the form of being extended in the surface direction.

Herein, the flatness ratio of the cells of the core material is a constant or above means that most of the cell membrane of the core material is in the state of standing in the thickness direction of the core material.

That is, the flatness ratio of the cells of the core material is a constant or above means that the core material has high capability of resisting compression strength added in the thickness direction thereof.

Also, the flatness ratio of the cells of the core material is a constant or above means that, if the core material is extended in the planar direction, the cells easily deform in this direction and it is difficult for the cell membrane to rupture.

That is, the resin composite A of the present embodiment, by having a flatness ratio of the cells from the surface of the corner section Ac to a depth of 2.5 mm of 20% or more, the corner section Ac, in which the occurrence of stress concentration is easy, is reinforced, and it is difficult for trouble such as damage to occur.

Furthermore, it is difficult for damage and the like to occur for the resin composite A of the present embodiment since the thickness of this corner section Ac is thicker than the bottom surface section Aa and the side wall section Ab.

In addition, in the composite resin A, even if the corner section Ac does not satisfy the aforementioned conditions in the entire peripheral region of the bottom surface section Aa, it can be expected that such effects are exhibited if a part satisfies the aforementioned conditions.

In addition, in order to more significantly exhibit the effects, at the very least, it is preferable that the aforementioned conditions are satisfied in the highly-shaped section having the smallest radius of curvature.

In the resin composite A of the corner section Ac, preferably 50% or more of the entire corner section satisfies the aforementioned conditions.

In the case where the thickness of the core material A is thin in the highly-shaped section and the like having the smallest radius of curvature of the corner section Ac, and the core material is penetrated from the surface of the corner section Ac until a depth of 2.5 mm is reached, the flatness ratio of the cells in the entire space until the core material is penetrated is preferably 20% or more.

In addition, also in the case of a thin core material in which until the opposite surface is penetrated from the surface in the entire corner section until a depth of 2.5 mm is reached, the flatness ratio of the cells in the entire space in the depth direction in the entire corner section is preferably 20% or more.

A high flatness ratio of the cells of the highly-shaped section B or the like is advantageous in order to cause superior compression strength to be exhibited by the resin composite.

Also, a high flatness ratio of the cells of the highly-shaped section B or the like is advantageous in order to suppress peeling with the FRP layer by making the core material have resilience.

Accordingly, it is important for the flatness ratio of the cells of the highly-shaped section B to be 20% or more.

Also, the flatness ratio of the cells of the highly-shaped section B is preferably 30% or more, and more preferably 40% or more.

On the other hand, if the flatness ratio of the cells of the core material A1 of the highly-shaped section B is too large, it is difficult for the cells of the highly-shaped section B to be flexibly deformed by an external force.

Accordingly, the flatness ratio of the cells of the highly-shaped section B is preferably 95% or less, and more preferably 90% or less.

Figure 2:
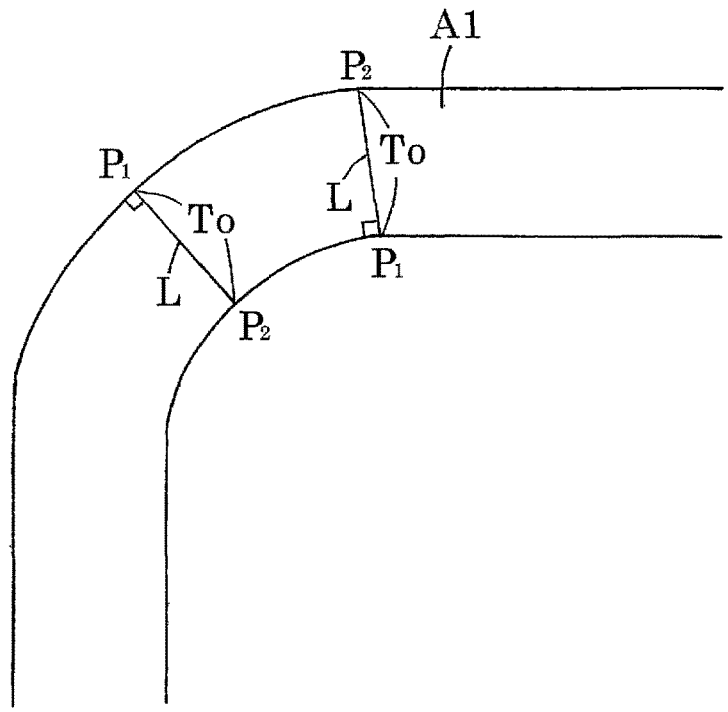
FIG. 2 is a schematic diagram showing the procedure for measuring the thickness of the core material of the resin composite of the first embodiment.

Herein, the thickness of the core material A1 of the resin composite A can be determined by as shown in FIG. 2.

That is, the thickness of the core material A1 is referred to a length $T_0$ of a straight line L with both ends thereof taken as $P_1$, $P_2$, wherein a straight line is drawn from an arbitrary point $P_1$ on the surface of the core material A1 so as to reach the surface of the opposite side in the shortest distance and $P_2$ is defined as the point at which the surface of the opposite side of the core material A1 and the straight line intersect.

Also, the highly-shaped section B of the resin composite A is determined by the below-mentioned procedure.

Figure 3:
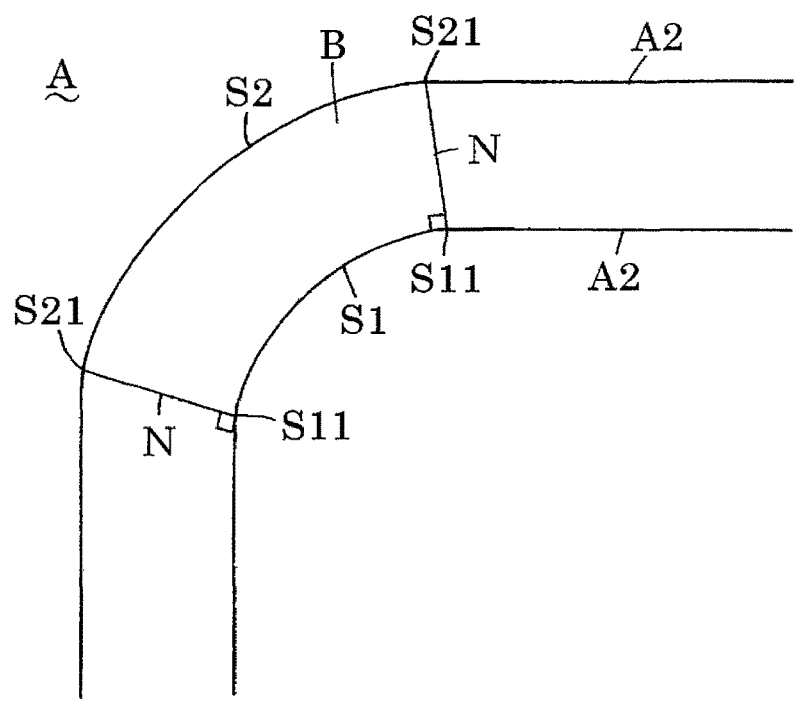
FIG. 3 is a schematic diagram showing the procedure for measuring the highly-shaped section of the resin composite of the first embodiment.
Figure 4:
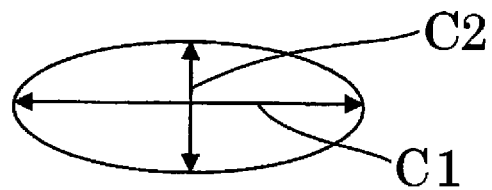
FIG. 4 is s schematic diagram showing the procedure for calculating the flatness ratio of cells.

As shown in FIG. 3, in the resin composite A, before and after thermoforming of the expanded sheet 1, as the target of the part in which the shape of the expanded sheet changes, the radius of curvature of the FRP layer A2 surface of the resin composite A is measured.

The radius of curvature of the FRP layer A2 surface, using a part having bent surface for determining the radius of curvature as a measurement sample, can be determined by observing the cross-section of the cut measurement sample.

In addition, the cutting of the measurement sample is carried out so that the radius of curvature of the FRP layer A2 surface becomes a minimum.

Also, the cross-section is observed with an electron microscope and is decided by determining the radius of a circle fitting the curved line of the part for determining the radius of curvature.

If a large number of resin composites A of the same shape can be prepared, the radius of curvature of the same part for five resin composites A for example is measured and the arithmetically averaged value of these radii of curvature can be used as the radius of curvature of such part.

Thereby, among the FRP layer A2 surface, the surface S1 having the smallest radius of curvature is determined.

From both ends S11, S11 of this surface S1, virtual lines N, N perpendicular to the surface of the FRP layer A2 are drawn along the total length of the thickness of the resin composite A, and the intersection points S21, S21 between the surface S2 of the FRP layer A2 on the side opposite to the surface S1 of the FRP layer A2 and the virtual lines N, N are determined.

The part surrounded by the surface S1 having S11, S11 as both ends thereof, the surface S2 having S21, S21 as both ends thereof and the virtual lines N, N is used as the highly-shaped section B.

The thickness $T_2$ of the core material A1 of the highly-shaped section B refers to the thickness of the core material A1 at the intermediate point of the surface S1.

In FIG. 3, the layered structure of the resin composite A is omitted.

The flatness ratio of the cells of the core material A1 of the resin composite A refers to the value measured by the below-mentioned procedure.

The core material A1 is cut at the plane orthogonal to the interface with the FRP layer A2.

An enlarged photo at 200 times magnification is taken of this cut surface.

Among the cells of the core material A1 that appeared in the enlarged photo, 30 cells in the region from the surface to 2.5 mm were randomly extracted.

Also, in a thin core material in which before reaching a depth of 2.5 mm from the surface they reached the surface on the opposite side to this surface, 30 cells from the entire region until this opposite surface is reached are randomly extracted.

In addition, if an expanded sheet having a thin thickness is used as the core material, for example, when the number of cells in the highly-shaped section and the like is less than 30, the flatness ratio is determined by all of these less than 30 cells.

Regarding these 30 cells, among straight lines joining two arbitrary points on the contour of the cells, the longest straight line C1 is determined.

Next, the longest line C2 that joins two points on the contour of the cells and bisects the aforementioned straight line C1 is determined. For each cell, the flatness ratio of the cell is calculated based on the below-mentioned equation and the arithmetically averaged value of the flatness ratio of each cell is used as the cell flatness ratio.

In addition, the cutting of the resin composite A can be carried out by, for example, attaching a cutting blade (product name "Laser Beam Saw LBS AURORA260Z" manufactured by Tanitec Corporation) to a slide cutting machine commercially-available as the product name "LS1213" from Makita Corporation.

The enlarge photo of the cut surface can be obtained using an electron microscope commercially available as the product name "Digital Microscope VHX-1000" from Keyance Corporation.

Cell flatness ratio (%)=100×(length of straight line C2)/(length of straight line C1)

The core material A1 of the resin composite A preferably has an unexpanded layer on the surface layer thereof.

By having an unexpanded layer on the surface of the core material A1, the core material A1 and the FRP layer A2 can be firmly integrated, and superior mechanical properties can be exhibited by the resin composite A.

Regarding the average thickness of the unexpanded layer of the core material A1, a thin unexpanded layer is advantageous in that superior light weight properties and resilience are exhibited by the resin composite.

Regarding the average thickness of the unexpanded layer of the core material A1, a thick unexpanded layer is advantageous in that superior mechanical properties are exhibited by the resin composite.

Accordingly, the average thickness of the unexpanded layer of the core material A1 is preferably 0.005 to 0.4 mm, and more preferably 0.01 to 0.3 mm.

In addition, the thickness of the unexpanded layer of the core material A1 refers to the thickness in the direction orthogonal to the surface of the unexpanded layer of the core material A1.

The average thickness of the unexpanded layer of the core material A1 refers to average value of the minimum thickness and the maximum thickness of the unexpanded layer.

The thickness of the core material A1 roughly is preferably 1 to 10 mm, more preferably 1 to 5 mm, and particularly preferably 1 to 3 mm.

Also, the apparent density thereof is preferably 0.05 to 1.2 g/cm$^3$, and more preferably 0.08 to 0.9 g/cm$^3$.

In addition, the apparent density of the core material A1 refers to the value calculated in accordance with JIS K7222 "Expanded Plastic and Rubber-Measurement of Apparent Density". The measurement of the apparent density of the core material A1 of the resin composite A is measured using the core material after the FRP layer A2 has been peeled from the resin composite A.

Regarding the apparent density of the core material A1, a low apparent density is advantageous in that superior light weight properties and resilience are exhibited by the resin composite.

Regarding the apparent density of the core material A1, a high apparent density is advantageous in that superior mechanical properties are exhibited by the resin composite.

The expanded sheet for forming the core material can be produced by a known method utilizing a chemical blowing agent or a physical blowing agent.

The core material can be produced by thermoforming an expanded sheet by a known method.

As the chemical blowing agent, for example, azodicarbonamide, dinitroeopentamethylenetetramine, hydrozoyldicarbonamide, sodium bicarbonate, and the like can be mentioned. In addition, the chemical blowing agent may be used alone or may be using by combining two or more thereof.

As the physical blowing agent, for example, a saturated aliphatic hydrocarbon such as propane, normal butane, isobutane, normal pentane, isopentane, and hexane; ethers such as dimethyl ether; methyl chloride; a fluorocarbon such as 1,1,1,2-tetrafluoroethane, 1,1-difluoroethane, and monochlorodifluoromethane; carbon dioxide; and nitrogen can be mentioned. Dimethyl ether, propane, normal butane, isobutane, and carbon dioxide are preferable; propane, normal butane, isobutane are more preferable, and normal butane and isobutane are particularly preferable. In addition, the physical blowing agent may be used alone or may be used by combining two or more thereof.

The fiber-reinforced resin material forming the FRP layer includes a resin and fibers (reinforcing fibers). In the present embodiment, a sheet-like fiber-reinforced resin material (FRP sheet) can suitably be used.

As the reinforcing fibers, inorganic fibers such as glass fibers, carbon fibers, silicon carbide fibers, alumina fibers, tyranno fibers, basalt fibers, and ceramic fibers; metal fibers such as stainless fibers and steel fibers; organic fibers such as aramid fibers, polyethylene fibers, and polyparaphenylene benzoxadole (PBO) fibers; boron fibers; and the like can be mentioned.

One type of the reinforcing fibers may be used alone or two or more types may be combined.

Among these, the fibers contained in the FRP layer are preferably any of carbon fibers, glass fibers, and aramid fibers, and carbon fibers are more preferable.

The reinforcing fibers are preferably used in the formation of the FRP layer as a fiber base material processed into a desired shape.

As the fiber base material, a woven material, a knitted material, and a nonwoven fabric using reinforcing fibers; a sheet material in which a fiber bundle (strands) in which reinforcing fibers are arranged in one direction are bound (sutured) with a thread; and the like can be mentioned.

As the way of weaving the woven material, plain weave, twill weave, satin weave, and the like can be mentioned.

Also, as the thread, a synthetic resin thread such as a polyamide resin thread and a polyester resin thread; a stitch thread such as a glass fiber thread can be mentioned.

Regarding the sheet material, a plurality thereof may form one FRP layer or may be used in the formation of FRP layer in the state of a laminated sheet in which a plurality thereof are laminated.

The laminated sheet used in formation of the FRP layer may be a laminated sheet of only one type of sheet material or may be a laminated sheet of multiple types of sheet materials.

The FRP layer can be formed by an FRP sheet in which a resin has been impregnated into one sheet material or a laminated sheet.

The resin contained into the FRP sheet may be a thermoplastic resin or may be a thermosetting resin.

As the thermosetting resin contained into the FRP sheet, for example, an epoxy resin, an unsaturated polyester resin, a phenol resin, a melamine resin, a polyurethane resin, a silicone resin, a maleimide resin, a vinyl ester resin, a cyanic acid ester resin, a pre-polymerized resin of a maleimide resin and a cyanic acid ester resin, and the like can be mentioned.

The thermosetting resin used in the formation of the FRP layer A2, from having superior heat resistance, impact absorption properties, and chemical resistance, is preferably an epoxy resin or a vinyl ester resin.

The FRP sheet may include a curing agent or a curing accelerant in order to cure the thermosetting resin, and may contain other additives.

In addition, the thermosetting resin contained in the FRP sheet may be one type or may by two or more types.

As the epoxy resin contained in the FRP sheet, for example, a polymer or copolymer having a linear chain structure of epoxy compounds, and a copolymer having a linear structure of an epoxy compound and a monomer copolymerizable with this epoxy compound can be mentioned.

Specifically, as the epoxy resin, a bisphenol A-type epoxy resin, a bisphenol fluorene-type epoxy resin, a cresol novolak-type epoxy resin, a phenol novolak-type epoxy resin, a cyclic aliphatic-type epoxy resin, a long-chain aliphatic-type epoxy resin, a glycidyl ester-type epoxy resin, a glycidyl amine-type epoxy resin, and the like can be mentioned.

Among these, as the epoxy resin contained in the FRP sheet, a bisphenol A-type epoxy resin, a bisphenol fluorene-type epoxy resin, and the like are preferable.

In addition, the epoxy resin contained in the FRP sheet may be one type or may by two or more types.

If the resin contained in the FRP sheet is a thermoplastic resin, there are particularly no limitations as the thermoplastic resin.

As the thermoplastic resin contained in the FRP sheet, for example, an olefin-based resin, a polyester-based resin, an amide-based resin, a thermoplastic polyurethane resin, a sulfide-based resin, an acrylic-based resin, and the like can be mentioned.

From adhesion with the core material or adhesion of reinforcing fibers forming the FRP layer being superior, the thermoplastic resin contained in the FRP sheet is preferably a polyester-based resin.

In addition, the thermoplastic resin contained in the FRP sheet may be one type, or may be two or more types.

As the aforementioned thermoplastic polyurethane resin, a polymer having a straight-chain structure obtained by polymerizing a diol and a diisocyanate can be mentioned.

As this diol, for example, ethylene glycol, diethylene glycol, propylene glycol, dipropylene glycol, 1,3-butanediol, 1,4-butanediol, and the like can be mentioned.

The diol forming the thermoplastic polyurethane resin may be one type, or may be two or more types.

As the diisocyanate, for example, an aromatic diisocyanate, an aliphatic diisocyanate, and an alicyclic diisocyanate can be mentioned.

The diisocyanate forming the thermoplastic polyurethane resin may be one type, or may be two or more types.

In addition, the thermoplastic resin contained in the FRP sheet may be one type, or may be two or more types.

Regarding the resin in the FRP layer, a large amount is preferable in that good binding property between reinforcing fibers and adhesive property between the FRP layer A2 and the core material A1 can be obtained.

On the other hand, an FRP layer having a small amount of resin and a high content of fibers is advantageous in that superior mechanical strength can be exhibited.

Accordingly, the content of resin in the FRP layer is preferably 20 to 70% by mass, and more preferably 30 to 60% by mass.

The thickness of the FRP layer is preferably 0.02 to 2 mm, and more preferably 0.05 to 1 mm.

An FRP layer with a thickness within the aforementioned range has superior mechanical properties regardless of whether it is lightweight.

The weight per area of the FRP layer is preferably 50 to 4,000 g/m$^2$, and more preferably 100 to 1,000 g/m$^2$.

An FRP layer with a weight per area within the aforementioned range has superior mechanical properties regardless of whether it is lightweight.

Next, an example of the production method of the resin composite A is explained.

Hereinafter, although when using press molding as the thermoforming method is exemplified, it is not limited to when a press molding method is used as the production method of the resin composite A.

Figure 5:
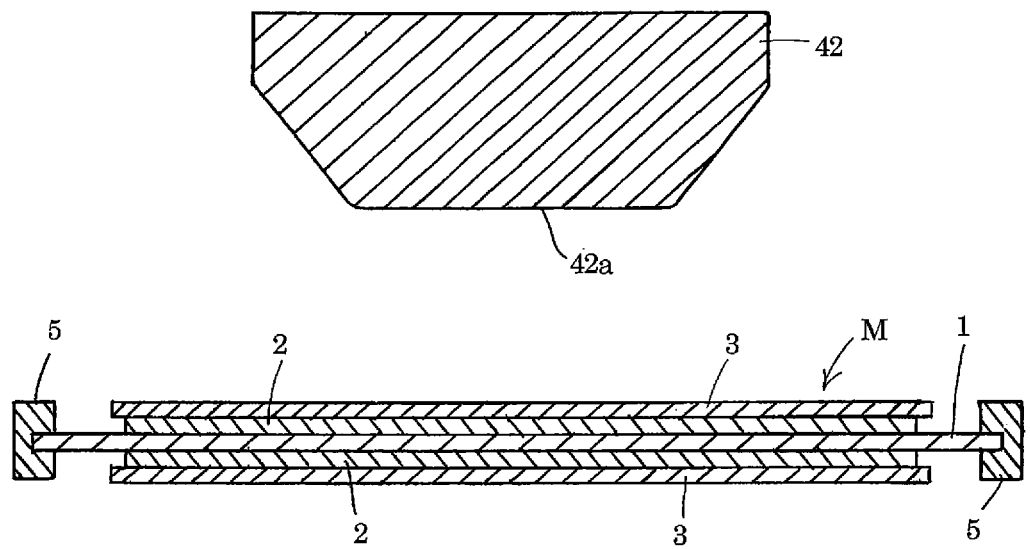
FIG. 5 is a schematic diagram showing the state in which the laminate is arranged between female and male dies.
Figure 5:
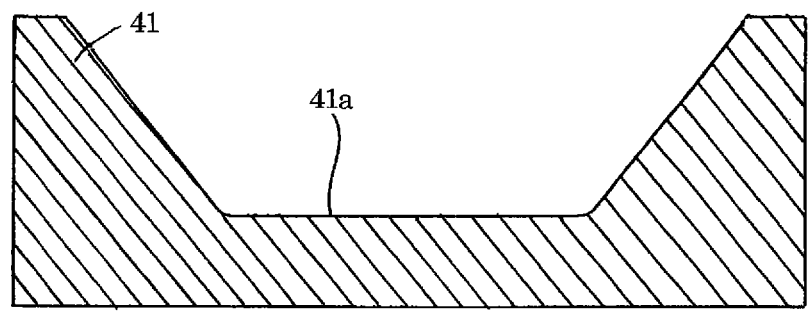
Figure 6:
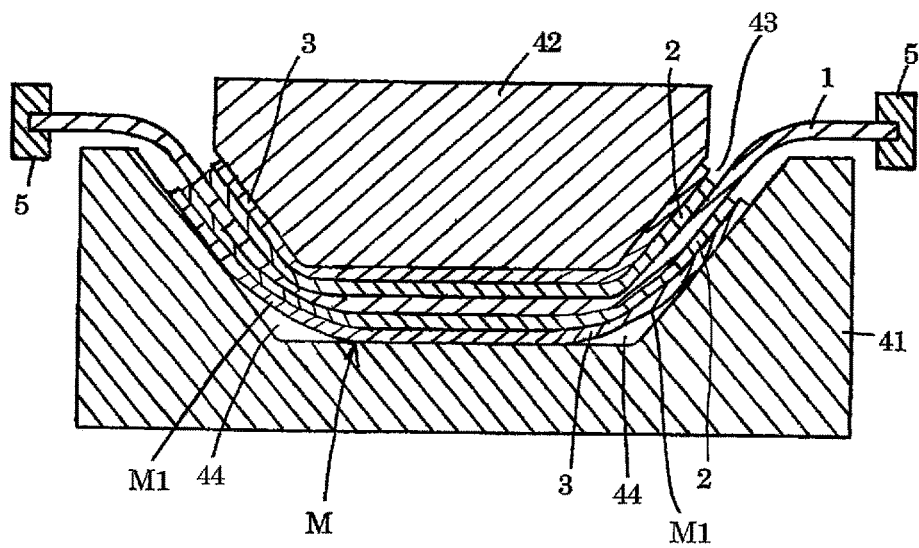
FIG. 6 is a schematic diagram showing the state before secondary expansion of the expanded sheet of the laminate.
Figure 7:
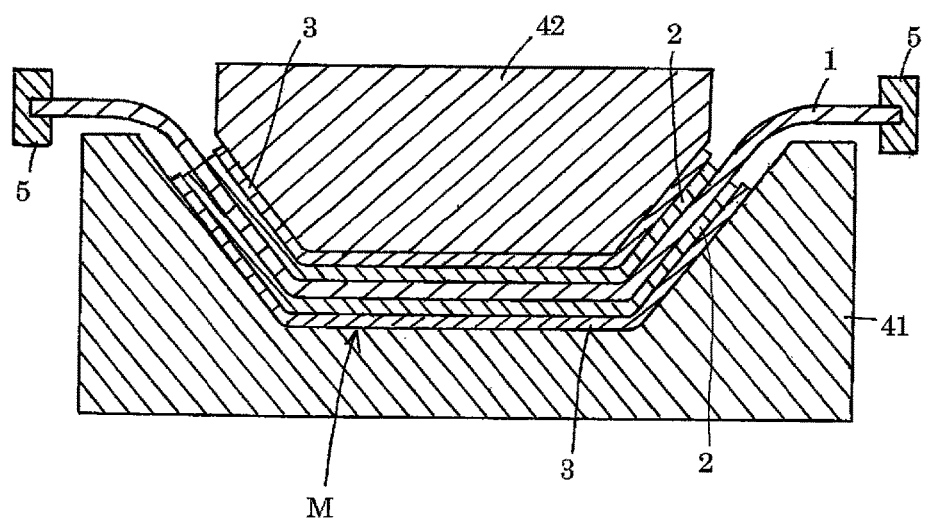
FIG. 7 is a schematic diagram showing the state after secondary expansion of the expanded sheet of the laminate.

As shown in FIGS. 5 to 7, a fiber-reinforced composite A, for example, can be produced by a carrying out a first step in which a sheet-like fiber-reinforced resin material 2 (FRP sheet 2) is laminated on at least one surface of the expanded sheet 1 to produce a pre-molded article M, and a second step in which the pre-molded article in a heated state is pressurized by a mold die to thermobond the core material and the fiber-reinforced resin material.

The fiber-reinforced composite A of the present embodiment can be made a state in which simply a plate-like two-dimensional expanded sheet 1 is made into a state having a three-dimensional shape in this second step.

Also, in the present embodiment, by this second step, a resin composite including a core material having a corner section in which surfaces covered by the fiber-reinforced resin material are adjoined at an inner angle of less than 180 degrees can be produced.

In the first step, when laminating the FRP sheet 2 on at least one surface of the expanded sheet 1, from the viewpoint of handability improvement of the pre-molded article in the step thereafter, the fiber-reinforced resin material 2 is preferably temporary adhered to the expanded sheet 1.

The temporary adhesion between the expanded sheet 1 and the FRP sheet 2 may be carried out by the resin impregnated into the FRP sheet 2 or a separately prepared known adhesive may be used.

In addition, the temporary adhesion of the expanded sheet 1 and the FRP sheet 2 is preferably carried out so that the FRP sheet 2 can freely move on the expanded sheet 1 at the time of thermobonding in the step thereafter.

Regarding the temporary adhesion force between the expanded sheet 1 and the FRP sheet 2, a high temporary adhesion force is advantageous since unexpected separation of the expanded sheet 1 and the FRP sheet 2 at the time of handling the pre-molded article is prevented.

On the other hand, in the second step, removing adhesion between the expanded sheet 1 and the FRP sheet 2 to relatively move the expanded sheet 1 and the FRP sheet 2 is advantageous in that a resin composite having a good appearance and superior strength is obtained.

Accordingly, the temporary adhesion force is preferably 1 to 300 N/cm$^2$, and more preferably 1 to 100 N/cm$^2$.

In addition, the temporary adhesion force between the expanded sheet 1 and the FRP sheet 2 refers to, in accordance with JIS K6850 (1999), the shear tensile strength measured at a test speed of 10 mm/min for a piece that is cut out from the pre-molded article and used as a test piece.

In addition, the temporary adhesion force between the expanded sheet 1 and the FRP sheet 2 can be measured by a small-type tabletop test machine (product name "FGS1000TV/1000N+FGP-100" manufactured by Nidec-Shimpo Corporation).

When producing the pre-molded article M, a mold release film 3 formed from a synthetic resin film may be laminated on the fiber-reinforced resin material 2 in order to make removal of the resin composite from the mold die after molding easier.

As the synthetic resin forming the mold release film, there are no particular limitations so long as it has peelability from the FRP sheet 2 and the mold die, and, for example, a fluorine-based resin such as a tetrafluoroethylene-ethylene copolymer (ethylene tetrafluoride-ethylene copolymer); a polystyrene-based resin; a polyester-based resin; and the like can be mentioned.

In the first step, for example, a belt-like expanded sheet and two belt-like FRP sheets having a width smaller than the expanded sheet are prepared, and a pre-molded article M in a state in which the expanded sheet extends to the outside more than the FRP sheets in both end sections in the width direction by laminating the FRP sheet on both surfaces of the expanded sheet.

In this case, the second step is preferably carried out in the state in which both end sections in the width direction of the expanded sheet 1 forming the pre-molded article M are held, while at least one end section of the FRP sheets 2 is not held.

That is, as shown in FIG. 6, the second step is preferably carried out in the state in which both end sections of the FRP sheets 2 are not held.

When press molding the pre-molded article M by not holding at least one end section of the fiber-reinforced resin material 2, it becomes a state in which the FRP sheets 2 can move on the expanded sheet 1.

That is, when molding the pre-molded article with the female and male dies 41, 42 by not holding at least one end section of the FRP sheets 2, it is possible to make the deformation behavior of the FRP sheets 2 and the expanded sheet 1 independent of each other.

Accordingly, by carrying out the second step in a state in which at least one end section of the FRP sheets 2 is not held, the step can be carried out smoothly.

Holding of the expanded sheet 1 can be carried out using a known equipment such as a clamp 5.

Also, the holding position of the expanded sheet 1 is not particularly limited, and, for example, the outer peripheral section opposing the expanded sheet 1, the square outer peripheral section of the expanded sheet, and the like can be mentioned.

In the second step, the resin composite A in which the core material A1 and the FRP layer A2 are integrally laminated by pressurizing in a heated state the pre-molded article M in which the expanded sheet 1 is held as mentioned above and thermobonding the expanded sheet 1 and the fiber-reinforced resin material 2.

At this time, the pre-molded article M is heated to soften the resin impregnated in the fiber-reinforced resin material 2.

If this fiber-reinforced resin material 2 includes uncured thermosetting resin, it is preferably made a state have fluidity by softening the uncured thermosetting resin.

The thermosetting resin normally becomes a state having fluidity before thermosetting when heated.

Accordingly, in the second step until completion of thermoforming, the temperature is preferably controlled so that the state in which the thermosetting resin has fluidity is maintained.

Also, if the fiber-reinforced resin material 2 includes a thermoplastic resin, the second step is preferably carried out by controlling the temperature so as to become a state in which the thermoplastic resin has fluidity.

In addition, as the heating means of the pre-molded article M, a known heating device such as an infrared heater may be used.

When carrying out the second step, it is preferably made a state in which molding is easily possible by softening the expanded sheet 1 by heating the pre-molded article M and press molding of the pre-molded article M.

The second step, as shown in FIGS. 5 and 6, can be carried out by placing the pre-molding article M in a heated state between the female and male dies 41, 42, and die-clamping the female and male dies 41, 42.

In addition, regarding the dies, a cavity 43 is formed therebetween when the female die 41 and the male die 42 are closed, and are formed so as to become a state in which the pre-molded article M is placed in this cavity 43.

In addition, in that mentioned above, although the case of the pre-molded article M being arranged between female and male dies 41, 42 after being heated is explained, the pre-molded article M may be heated after being placed between the female and male dies 41, 42.

The dies, in the sites for forming the corner section Ac, preferably include a cavity having a volume greater than the volume of the pre-molded article M.

By this, in die-clamping, a surplus space 44 (hereinafter, also referred to as "expanded space section 44") between thermosetting faces 41$a$, 42$a$ of the female and male dies 41, 42 and the pre-molded article M is formed.

Also, by using in the second step an expanded sheet 1 in which a blowing agent is included in at least the sites to become the corner section Ac, in the second step, the expanded sheet 1 in at least only the volume part of this surplus space 44 can be secondary expanded.

The core material A2 thereby becomes a state in which cells of the corner section Ac are largely roundish and the flatness ratio of the cells from the surface of the corner section to a depth of 2.5 mm becomes 20% or more.

Regarding the pre-molded article M, at the time of press molding, the expanded sheet 1 easily extends in the surface direction in the sites to become the corner section Ac of the core material, and thus it is easy to reduce the thickness of the expanded sheet.

However, in the present embodiment, the expanded sheet includes a blowing agent, and thus secondary expansion can be made to occur in the expanded sheet.

Also, by this secondary expansion, the thickness in the corner section Ac can be made thicker than that thickness in bottom surface section Aa and the side wall section Ab.

The second step, on the point of thus easily giving a predetermined thickness to each site, is preferably carried out using the female and male dies 41, 42 forming a cavity of a predetermined shape therebetween.

Furthermore, in the state of the female and male dies 41, 42 die-clamped, by secondary expanding the expanded sheet 1, the expanding power of this expanded sheet 1 can be utilized as the pressure generated between the fiber-reinforced resin material 2.

In other words, by carrying out the second step by using the female and male dies 41, 42 forming the cavity of a predetermined shape and using an expanded sheet containing a blowing agent, the effect of adhesion between the core material A1 and the FRP layer A2 is superior, and it becomes easier to obtain a composite resin in which the shape of the molding face of the dies is truly reflected.

In the present embodiment, by secondary expanding the expanded sheet 1 in the state in which the female and male dies 41, 42 are die-clamped as mentioned above, regardless of the expanded sheet 1 being extended at the time of press molding, the cells in the expanded sheet 1 in the sites to become the corner section of the core material can be prevented from becoming excessively flat and it can be made so as to become a state close to where the cells are spherical as much as possible.

The closer the cells are spherical, the core material shows a strong resistance power to the compression force applied to cells.

Furthermore, the core material can improve the degree of freedom of deformation by an external force the closer the cells thereof are in a spherical state, Accordingly, the resin composite of the present embodiment has superior tracking with respect to an external deformation force.

The thickness swelling coefficient (hereinafter, may be simple referred to as "swelling coefficient") of the expanded sheet on heating at 150° C. for 1 minute can be used as a reference for secondary expansion of the expanded sheet at the time of press molding in the second step.

A high swelling coefficient of the expanded sheet can prevent thickness insufficiency of the core material and can impart superior strength to the resin composite.

Accordingly, the swelling coefficient of the expanded sheet is preferably 0.5% or more, more preferably 3% or more, further preferably 5% or more, particularly preferably 8% or more, and most preferably 10% or more.

With a low swelling coefficient of the expanded sheet, the load on the pressing machine becomes smaller.

Accordingly, the swelling coefficient of the expanded sheet is preferably 150% or less, more preferably 100% or less, and particularly preferably 35% or less.

In addition, the swelling coefficient of the expanded sheet can be measured by the below-mention procedure.

A planar square-shaped test material with a side of 15 cm was cut out from the expanded sheet.

The thickness of the test piece at 9 arbitrary positions is measured and the arithmetically averaged value thereof is used as the thickness before heating $t_1$.

Next, after heating the test piece for 1 minute so that the surface temperature of the test piece becomes 150° C., the test piece was left to stand in an atmosphere at 25° C. for 60 minutes.

Thereafter, the thickness of the test piece was measured at 9 arbitrary places, and the arithmetically averaged value thereof was used as the thickness after heating $t_2$.

The swelling coefficient of the expanded sheet was calculated by the following equation based on the thickness before heating $t_1$ and the thickness after heating $t_2$.

$$\text{Swelling coefficient (\%) of expanded sheet by heating of 150° C.} \times 1 \text{ min} = 100 \times (t_2 - t_1)/t_1$$

The swelling coefficient of the expanded sheet can be controlled by the amount of blowing agent included in the expanded sheet, and if the expanded sheet includes a crystalline resin, by the degree of crystallinity thereof.

That is, the swelling coefficient of the expanded sheet can be increased by increasing the amount of blowing agent included in the expanded sheet.

Also, the heated thickness swelling coefficient of the expanded sheet can be increased by making the degree of crystallinity of the crystalline resin included in the expanded sheet a low state.

In addition, the amount of blowing agent in the expanded sheet is measured by the following procedure.

Firstly, a mass ($W_1$) of the entire expanded sheet is measured.

Next, the amount of blowing agent ($W_2$) in the expanded sheet is measured.

In addition, the amount of blowing agent in the expanded sheet can be measured using a gas chromatograph, for example, the amount of blowing agent in the expanded sheet can be measured using the following device under the following conditions.

10 to 30 mg of a sample taken from the expanded sheet is inserted into a 20 mL vial and accurately weighed. The vial is sealed and set in a gas chromatograph equipped with an autosampler, and, after heating the vial at 210° C. for 20 minutes, the gas in the upper space of the vial was quantitatively analyzed by an MHE (Multiple Headspace Extraction) method, and the amount of blowing agent ($W_2$) in the expanded sheet is measured.

Herein, the MHE method is a quantitative method utilizing attenuation of peak area obtained by repeating release of a gas phase gas in gas-solid equilibria.

[GC Measurement Conditions]

Measurement Device: Gas Chromatograph Clarus500 (manufactured by Perkin-Elmer)

Column: DB-1 (1.0 μm×0.25 mm φ×60 m; manufactured by J & W)

Detector: FID

GC oven temperature rising conditions: Initial temperature of 50° C. (6 min)

Temperature rising rate: 40° C./min (to 250° C.)

Final temperature: 250° C. (1.5 min)

Carrier gas (He), Injection port temperature: 230° C., Detection temperature: 310° C.

Range: 20

Vent gas 30 mL/min (He), Additional gas 5 mL/min (He)

Gas pressure: Initial pressure 18 psi (10 min), Pressure rising rate: 0.5 psi/min (to 24 psi)

[HS Measurement Conditions]

Measurement Device: HS Autosampler TurboMatrix HS40 (manufactured by Perkin-Elmer)

Heating temperature: 210° C., Heating time: 20 min, Pressurized gas pressure: 25 psi, Pressurized time: 1 min Needle temperature: 210° C., Transfer line temperature: 210° C., Sample introduction time: 0.08 min

[Calculation Conditions]
Calibration curve reference gas: Mixed gas (manufactured by GL Sciences Inc.)
Mixed gas content: i-butane about 1% by mass, n-butane about 1% by mass, balance nitrogen
Calculation method: Content of blowing agent in sample is calculated by a MHE method.
The results are all i-butane-converted amounts.
The content of the blowing agent in the expanded sheet can be calculated based on the following equation.

Content of blowing agent in expanded sheet (% by mass)=100×$W_2/W_1$

The degree of crystallization of the expanded sheet is preferably 15% or less, and is more preferably 10% or more.

The degree of crystallization of the expanded sheet can be controlled by adjusting the cooling rate of the expanded sheet directly after expansion.

For example, the faster the cooling rate of the expanded sheet is made directly after extrusion expansion, the lower the degree of crystallization of the obtained expanded sheet can be made.

In addition, the degree of crystallization of the expanded sheet can be measured by the method described in JIS K7122: 1987 "Plastic Heat of Transition Measurement Method".

Specifically, the degree of crystallization of the expanded sheet can be measured as mentioned below using a differential scanning calorimeter device (product name "Model DSC6220" manufactured by SII NanoTechnology Inc.).

About 6 mg of the square-shaped sample that was cut out from the expanded sheet was filled in the bottom of an aluminum measurement container so that is no gap and the sample is held under the conditions of a nitrogen gas flow rate of 30 ml/min at 30° C. for 2 min.

Thereafter, the DSC curve when the temperature of the sample rises from 30° C. to 290° C. at a rate of 10° C./min is obtained.

Alumina is used as the reference material when doing this.

If the expanded sheet is made of a thermoplastic polyester resin, the degree of crystallization of the expanded sheet can be determined by dividing the difference between the fusion heat quantity (mJ/mg) determined from the area of the fusion peak and the crystallization heat quantity (mJ/mg) determined from the area of the crystallization peak by the theoretical fusion heat quantity $\Delta H_0$ of complete crystallization of the polyester resin.

For example, the $\Delta H_0$ of polyethylene terephthalate is 140.1 mJ/mg.

The degree of crystallization of the expanded sheet is calculated based on the following equation.

Degree of crystallization of expanded sheet (%)=100×(|fusion heat quantity (mJ/mg)|·|crystallization heat quantity (mJ/mg)|)/$\Delta H_0$ (mJ/mg)

Thermoforming is easy when the thickness of the expanded sheet 1 is thin.

On the other hand, there is the advantage that a resin composite having superior mechanical strength such as compression strength is obtained if the thickness of the expanded sheet 1 is thick.

Accordingly, the thickness of the expanded sheet 1 is preferably 1 to 10 mm, more preferably 1 to 5 mm, and more preferably 1 to 3 mm.

Also, if an unexpanded layer is formed on the surface of the expanded sheet 1, when secondary expanding the expanded resin 1 in the cavity 43 formed between the female and male dies 41, 42, dimensional change in the thickness direction of the expanded sheet 1 can be caused easier than compared to dimensional change in the surface direction of the expanded sheet 1.

Accordingly, in order to obtain a resin composite in which the cells of the expanded sheet 1 are in a state close to spherical as much as possible, and mechanical properties such as compression strength and tracking with respect to an external deformation force are superior, it is preferable to use an expanded sheet 1 having an unexpanded layer.

In the second step, for example, if the expanded sheet 1 includes a crystalline resin, the heat resistance and the mechanical strength of the obtained resin composite may be further improved by increasing the degree of crystallinity of the crystalline resin.

Also, after the second step, if it has become the state in which the FRP layer includes uncured thermosetting resin, this uncured resin may be further cured.

The heating temperature in order to further cure the uncured thermosetting resin contained in the FRP layer may be the same as the heating temperature of the pre-molded article M at the time of press molding or may be changed. However, it is preferably a higher temperature than at the time of press molding in order to promote curing of the thermosetting resin.

Figure 8:
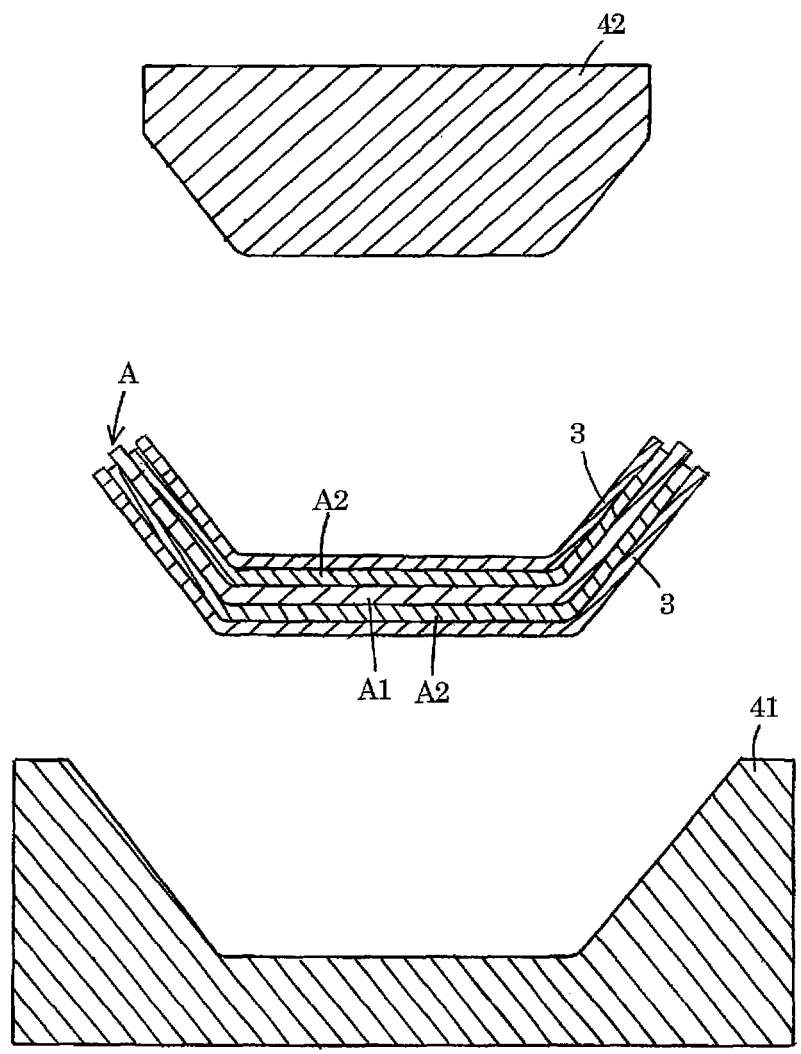
FIG. 8 is a schematic diagram showing the state in which the female and male dies are open, the resin composite is removed, and both end sections of the expanded sheet are cut.

Regarding the resin composite A, after cooling according to necessity and after the female and male dies 41, 42 have been opened and the resin composite A removed, excess parts may be cut off by trimming so as to be able to make the shape of the final product (refer to FIG. 8).

The resin composite A obtained thereby has the FRP layer A2, in which reinforcing fibers are firmly bound by the thermoplastic resin or the cured thermosetting resin, firmly integrally laminated on the surface of the core material A1, and has superior mechanical strength as well as superior lightweight properties and impact absorption properties from having an expanded body in a part thereof.

Furthermore, the core material A1 of the obtained resin composite A has a sufficient thickness in the shaped part and the cells of the core material A1 are not excessively flat.

Accordingly, the core material A1 shows a superior degree of freedom in compression strength and deformation, and superior compression strength and shock absorbance of an external force are exhibited by the resin composite.

The resin composite obtained thereby has superior mechanical strength such as compression strength and lightweight property, and thus can be used in a wide range of uses such as the transportation equipment field such as automobiles, airplanes, railway trains, ships; the household appliance field; the information terminal field; and the furniture field.

For example, the resin composite can be suitably used as transportation equipment components and transportation equipment constitutional materials (in particular, automobile members (ceiling panels, floor panels, door panels, and the like)) including structural members forming the body of transportation equipment; helmet shock-absorbing materials, agricultural product boxes; transportation containers such as hot/cold insulation containers; and component packaging materials.

(Second Embodiment)

In addition, although it was mainly explained above about a resin composite when the core material is expanded sheet as an example, in the present embodiment, a resin expanded body (bead expanded molded article) formed by a plurality of thermoplastic resin expanded particles being thermally fused by in-die molding and the like also can be mentioned as preferable core materials.

One example of a resin composite using a core material comprising a bead expanded molded article is explained with reference to FIGS. 9 to 11.

In the resin composite A, the FRP layer A2 is provided in the form of covering the entire surface of the core material A1.

Figure 9:
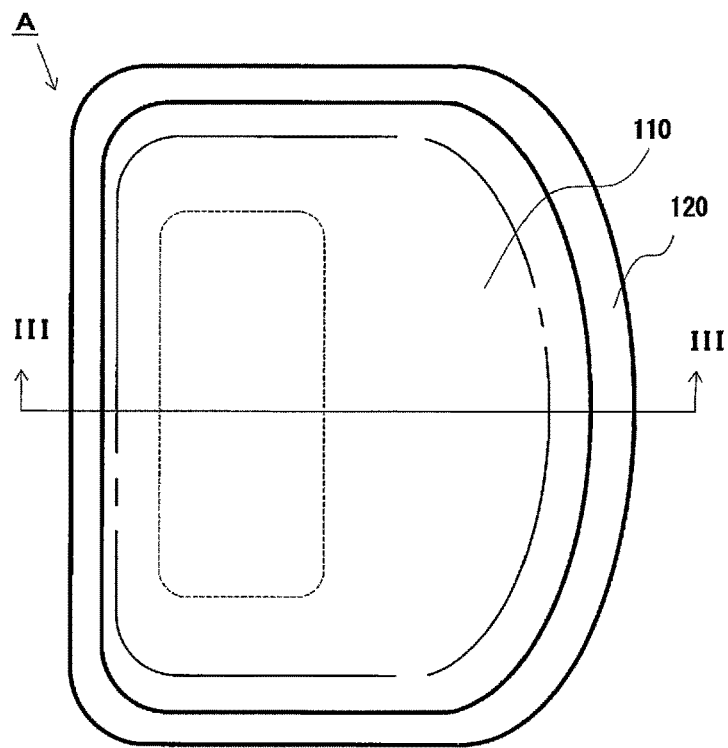
FIG. 9 is a planar view (top view) showing the resin composite of the second embodiment.

The resin composite A, like shown in FIG. 9, has a contour shape in planar view (top surface view) of a roughly vertically long rectangular shape.

More specifically, the resin composite A is a shape in which the entire contour shape is the alphabet capital letter "D" in which the contour shape on the left side of the front view in FIG. 9 is straight while the contour shape on the right side of the front view has a slightly bulging shape in the outer direction (right side).

The resin composite A is recessed other than on the outer edge section in planar view. As shown in FIG. 11, the resin composite A includes a bottom surface section 110 forming a bottom surface of a recessed section 100 and a side wall section 120 forming a side wall rising up from the outer edge of the bottom surface, and is formed into a tray-like shape as a whole.

Figure 10:
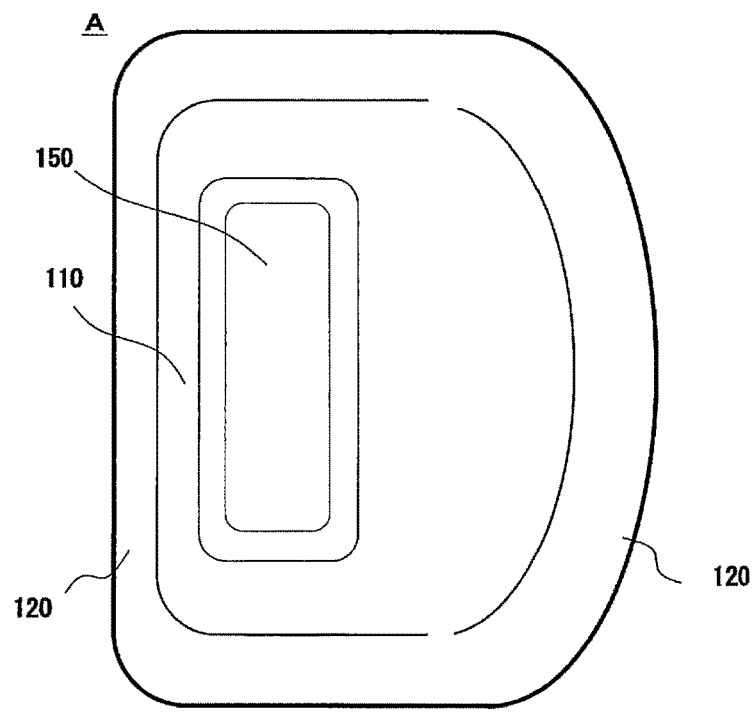
FIG. 10 is a planar view (bottom view) showing the resin composite of the second embodiment.
Figure 11:
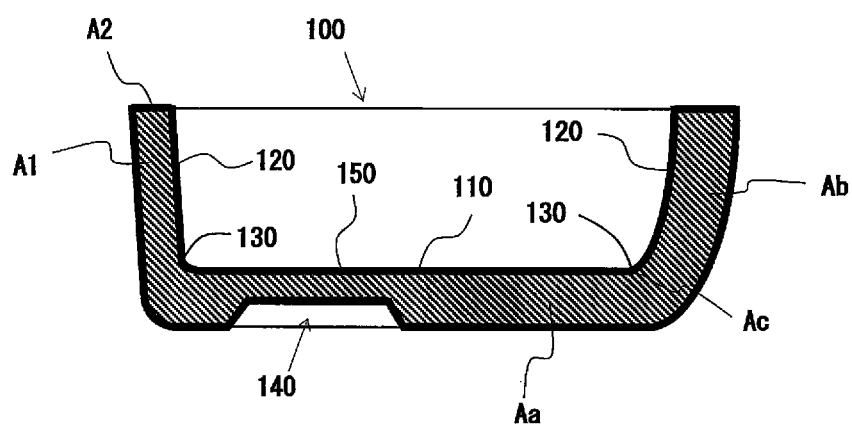
FIG. 11 is a cross-sectional view (cross-sectional view taken in the arrow direction along the line III-III of FIG. 9) showing the resin composite of the second embodiment.

In this bottom surface section 110, as shown in FIG. 10 showing the state of the bottom surface of the resin composite A, a second recessed section 140 in the opposite direction to the recessed direction of the recessed section 100 is formed so as to form a thin wall section 150.

In the present embodiment, the FRP layer A2 is a roughly uniform thickness and the core material A1 has a shape smaller than the resin composite A by only the thickness part of the FRP layer A2.

That is, the core material A1 according to the present embodiment, similar to the case of the resin composite A of the first embodiment, also has a bottom surface section Aa, a side wall section Ab, and a corner section Ac.

In addition, since the materials for forming the core material and the FRP layer, and the like are the same as the resin composite of the first embodiment, an explanation thereof has not repeated here.

Also, the core material A1 comprising the bead expanded molded article is the same as when the core material is an expanded sheet on the point of superior strength being exhibited by the resin composite by having a given cell state in the corner section Ac between the bottom surface section As and the side wall section Ab.

Also, when the core material A1 is such resin expanded body, it is the same as when the core material is an expanded sheet on the point that the thickness of the core material in the corner section Ac is preferably formed thicker than the adjacent bottom surface section Aa and side wall section Ab.

In addition, the resin composite of this second embodiment can be produced by, for example, after carrying out a first step in which a bead expanded molded article to become the core material is produced and a fiber-reinforced resin sheet is laminated on the surface of this bead expanded molded article to form a pre-molded article, carrying out a second step using dies including a cavity having a volume equivalent to or less than the pre-molded article.

Then, in this case also, by using dies that form the expanded space section 44 in the sites to become the corner section Ac, it can be made a state in which the cells in the corner section Ac of the core material are roundish.

That is, similar to the first embodiment, a resin composite with superior strength can also be obtained in the second embodiment.

Furthermore, similar to the resin composite of the first embodiment, the resin composite of this second embodiment can also be suitably utilized as a transportation equipment constitutional member such as an automobile member. However, such use is not particularly limited.

In addition, although a further detailed explanation is not carried out here, the resin composite of the present invention is not limited to the aforementioned exemplifications and it is possible to appropriately applying conventionally-known technical matters to the resin composite.

EXAMPLES

Although the present invention is further explained below by way of examples, the present invention is not limited by these examples.

Example 1

A thermoplastic polyester-based resin composition including the following (1a) to (1c) was supplied to a uniaxial extruder having a caliber of 65 mm and an L/D ratio of 35, and melt kneaded at 290° C.

(1a) 100 parts by mass of polyethylene terephthalate (PET, manufactured by Mitsui Chemicals Inc., product name: "SA185", glass transition temperature $T_g$: 79° C., melting point: 247.1° C., IV value: 0.86)

(1b) 0.72 parts by mass of talc (1c) 0.2 parts by mass of pyromellitic anhydride Next, from partway in the uniaxial extruder, mixed butane (35% by mass of isobutane/65% by mass of normal butane) was injected under pressure into a molten state thermoplastic polyester-based resin composition so as to become 1.1 parts by mass with respect to 100 parts by mass of the polyethylene terephthalate and were uniformly dispersed in the thermoplastic polyester-based resin composition.

Thereafter, in the front end section of the extruder, after cooling the molten state thermoplastic polyester-based resin composition to 220° C., this was extrusion molded in a cylindrical shape from a circular die attached to the front end of the extruder to produce a cylindrical expanded body.

The diameter of this cylindrical molded body was gradually expanded, and this was then supplied to a cooling mandrel and cooled so that the surface temperature of the expanded body became 25° C.

Thereafter, by continuously cutting the cylindrical expanded body in the extrusion direction thereof and spreading, a polyethylene terephthalate expanded sheet was produced.

The polyethylene terephthalate expanded sheet was cured for 48 hours at a room temperature of 25° C. directly after being produced.

The polyethylene terephthalate expanded sheet was cut into a planar square shape having a side of 350 mm.

In addition, a unexpanded layer was formed on both surfaces of the polyethylene terephthalate expanded sheet.

The expansion ratio, entire thickness, unexpanded layer average thickness and heated thickness swelling coefficient, degree of crystallization, and amount of residual gas (blowing agent content) of the polyethylene terephthalate expanded sheet are shown in Table 1.

Next, two fiber-reinforced resin sheets (product name "Pilofil TR3523-395GMP" manufactured by Mitsubishi Rayon Co., Ltd., weight per area: 200 g/m$^2$, thickness: 0.23 mm) comprising: a fiber-reinforced base material formed from a twill weave textile comprising carbon fibers; and a resin were prepared.

The fiber-reinforced resin sheets were a planar square shape with a side of 250 mm.

The fiber-reinforced resin sheets included 40% by mass of an uncured epoxy resin (glass transition temperature: 121° C.) as a thermosetting resin.

In the formation of the FRP layer, a laminated sheet in which the two fiber reinforced resin sheet have been overlapped so that the warp length directions thereof are at an angle of 90° to each other was used.

The laminated sheet was produced in a form in which the two fiber-reinforced resin sheets are integrated by an epoxy resin.

One laminated sheet was further produced by the same procedure as mentioned above.

The laminated sheet (fiber-reinforced resin material 2) was laminated on the central section on one surface of the aforementioned 350 mm square polyethylene terephthalate expanded sheet 1.

Using a compression bonding tool at a compression bonding surface temperature of 18±3° C. (product name "Sure Shot Iron SI-39S" manufactured by Ishizaki Electric Mfg. Co., Ltd., mass: 860 g), the laminated sheet was compression bonded (1.4±2 gf/cm²) on one surface side of the polyethylene terephthalate expanded sheet 1 by only the weight of the compression bonding tool.

Next, a mold release film 3 (product name "Oidys" manufactured by Kurabo Industries Ltd., special polystyrene-based resin film, thickness: 50 μm) was laminated on the fiber-reinforced resin material 2.

Furthermore, the fiber-reinforced resin material 2 and the mold release film 3 were laminated by the same procedure as mentioned above on the other surface of the polyethylene terephthalate expanded sheet 1 to produce a pre-molded article M.

The temporary adhesion strength between the polyethylene terephthalate expanded sheet and the fiber-reinforced resin material is shown in Table 1.

Next, the polyethylene terephthalate expanded sheet 1 of the pre-molded article M was held using a clamp at the edge section of two opposing sides thereof, while the fiber-reinforced resin material 2 was not at all held.

Thereafter, the pre-molded article M was heated at 150° C. for 5 sec to soften the uncured epoxy resin impregnated into the fiber-reinforced resin material 2 so as to become a state having fluidity.

In this state, the temporary adhesion between the polyethylene terephthalate expanded sheet 1 and the fiber-reinforced resin material 2 was completely removed, and was made a state in which the fiber-reinforced resin material 2 can freely move on the polyethylene terephthalate expanded sheet 1.

Subsequently, as shown in FIGS. 5 and 6, the aforementioned pre-molded article M was set between the female and male dies 41, 42, and, by die-clamping the female and male dies 41, 42, was press molded to mold the expanded sheet 1 of the pre-molded article M molded into a desired shape, as well as mold the fiber-reinforced resin materials 2, 2 into a desired shape while being made to slide on the polyethylene terephthalate expanded sheet 1.

At the time of press molding, it was controlled so that the pre-molded article M was maintained at 140° C. and so that the epoxy resin included in the fiber-reinforced resin material 2 did not cure and maintained fluidity.

Directly after die-clamping the female and male dies 41, 42, the expanded space section 44 for which secondary expansion of the expanded sheet 1 is possible is formed between all of the shaping target parts M1 (sites at which corner section Ac is formed) of the pre-molded article M set in the cavity 43 formed between the female and male dies 41, 42 and the thermoformed faces 41a, 41b of the female and male dies 41, 42 opposing these shaping target parts M1.

At the time of press molding, the pre-molded article M was shaped along the thermoformed surfaces 41a, 42a of the female and male dies 41, 42 while burying the expanded space section 44 by secondary expansion of the polyethylene terephthalate expanded sheet 1 of the aforementioned pre-molded article M, as well as the degree of crystallization of the polyethylene terephthalate forming the expanded sheet was improved.

Next, the pre-molded article M was heated to 145° C. and maintained thereat for 5 minutes to cure the uncured epoxy resin included in the fiber-reinforced resin materials 2, 2.

Then, reinforcing fibers of the fiber-reinforced resin material 2 were bound by the cured epoxy resin to form the FRP layer A2, and this FRP layer A2 was adhered onto both surfaces of the polyethylene terephthalate expanded sheet 1 by the epoxy resin.

Thereafter, the female and male dies 41, 42 in which the resin composite A was cooled to 30° C. or less were opened and the resin composite A was removed to obtain the resin composite A.

In addition, a part of the polyethylene terephthalate expanded sheet and the FRP layer was cut off as unnecessary parts.

The obtained resin composite A was integrally laminated in a state in which reinforcing fibers were bound by the cured thermosetting resin and the FRP layer 2 molded into the desired shape along the female and male dies 41, 42 was completely adhered along both surfaces of the polyethylene terephthalate expanded sheet 1.

In addition, the FRP layer had a thickness of 0.46 mm and a weight per area of 400 g/m².

Also, the cross-section of the resin composite A was in the state like shown in FIG. 1B.

The resin composite A had a planar rectangular-shape bottom surface section and a planar square frame-shaped side wall section extending upwards diagonally towards the outside from the four peripheral edges of this bottom surface section.

The upper end of the side wall section of the resin composite A was formed into a planar square shape of 220 mm length×120 mm width and the height from the inner bottom surface to the upper end of the side wall section of the resin composite A was 18 mm.

Example 2

An expanded sheet including an acrylic-based resin and having a unexpanded layer on the entire surface of both surfaces (expansion ratio: 10 times, product name: "FOA-MAC #1000 Grade" manufactured by Sekisui Plastics Co., Ltd., amount of urea as blowing agent: 6.3% by mass) was prepared as the expanded sheet.

The unexpanded layer was cut and removed from both surfaces of the expanded sheet to obtain an expanded sheet in which the cell cross-section is exposed on both surfaces.

Other than using this expanded sheet in which the cell cross-section is exposed on both surfaces instead of the polyethylene terephthalate expanded sheet, a composite resin A was obtained in the same manner as Example 1.

Example 3

The following (2a) and (2b) were melt kneaded in a uniaxial extruder.

(2a) 100 parts by mass of a styrene-methacrylic acid-methyl methacrylate copolymer (product name "MM290"

manufactured by PS Japan Corporation, content of styrene component: 84% by mass, content of methacrylic acid component: 11% by mass, content of methyl methacrylate component: 5% by mass, glass transition temperature: 130° C.)

(2b) Master batch in which talc is contained in a styrene-methacrylic acid-methyl methacrylate copolymer (product name "MM290" manufactured by PS Japan Corporation) (content of styrene-methacrylic acid-methyl methacrylate copolymer: 60% by mass, content of talc: 40% by mass)

Butane was injected under pressure into the uniaxial extruder so as to become 1.9 parts by mass with respect 100 parts by mass of the styrene-methacrylic acid-methyl methacrylate copolymer to produce a polystyrene-based resin expanded sheet.

Other than using this polystyrene-based resin expanded sheet instead of the polyethylene terephthalate expanded sheet, a composite resin A was obtained in the same manner as Example 1.

Example 4

Other than curing for 8 months at a room temperature of 25° C. directly after producing the polyethylene terephthalate expanded sheet, a resin composite was obtained in the same manner as Example 1.

Example 5

Other than not removing the unexpanded layer of the expanded sheet, a resin composite was obtained in the same manner as Example 2.

Example 6

Other than curing for 6 months at a room temperature of 18° C. directly after producing the polyethylene terephthalate expanded sheet, a resin composite was obtained in the same manner as Example 1.

Example 7

Other than using an expanded sheet comprising an acrylic-based resin and having a unexpanded layer on the entire surface of both surfaces (expansion ratio: 10 times, product name "FOAMAC #1000 Grade" manufactured by Sekisui Plastics Co., Ltd., amount of urea as blowing agent: 8.0% by mass) as the expanded sheet, a resin composite was obtained in the same manner as Example 2.

Example 8

Other than curing for 6 hours at a room temperature of 18° C. directly after producing the polystyrene-based resin expanded sheet, a resin composite was obtained in the same manner as Example 3.

Comparative Example 1

Other than curing for 3 months at a room temperature of 40° C. directly after producing the polyethylene terephthalate expanded sheet, a resin composite was obtained in the same manner as Example 1.

Comparative Example 2

Other than using an expanded sheet comprising an acrylic-based resin and having an unexpanded layer on the entire surface of both surfaces (expansion ratio: 15 times, product name "FOAMAC #1500 Grade" manufactured by Sekisui Plastics Co., Ltd.) as the expanded sheet, a resin composite was obtained in the same manner as Example 2.

Reference Example

Other than cooling so that the surface temperature becomes 65° C. by supplying a cylindrical body to a cooling mandrel, and heating the laminate M so as to become 130° C. and maintaining thereat at the time of press molding, a resin composite was obtained in the same manner as Example 1.

For the obtained resin composite, the thickness $T_1$ of the thinnest part, the thickness $T_2$ of the highly-shaped section, the cell flatness ratio in the corner section of the core material, the radius of curvature of the highly-shaped section, the compression strength per unit weight, the average thickness of the unexpanded layer, the apparent density of the core material, the degree of crystallization of the core material, and the height from the inner bottom surface to the upper end of the wall section (notated simply as "Height" in Table 1) were measured by the aforementioned or below-mentioned procedures, and the results thereof are shown in Table 1.

(Compression Strength Per Unit Weight)

The resin composite was mounted on a horizontal mounting surface in a state in which the opening section (upper edge of wall section) is facing downwards.

The central section of the bottom section was pressed downwards until the gap between the central section of the inner bottom surface of the resin composite and the mounting surface becomes 8 mm, and the compression strength in this state was measured.

The compression strength per unit weight was calculated by dividing the obtained compression strength by the mass of the resin composite.

A total of 10 resin composites were prepared, the compression strength per unit weight was calculated by the aforementioned procedure for each resin composite, and the arithmetically averaged value of these compression strengths per unit weight was used.

The compression strength per unit weight is preferably 500 kPa/g or more, and more preferably 600 kPa/g or more.

TABLE 1

| | | Example | | | | | | | | Comparative Example | | Reference |
|---|---|---|---|---|---|---|---|---|---|---|---|---|
| | | 1 | 2 | 3 | 4 | 5 | 6 | 7 | 8 | 1 | 2 | Example |
| | Butane amount (parts by weight) | 1.1 | — | 1.9 | 1.1 | — | 1.1 | — | 1.9 | 1.1 | — | 1.1 |
| Expanded sheet | Expansion ratio (times) | 4.5 | 10 | 14 | 4.5 | 10 | 4.5 | 10 | 14 | 6 | 15 | 4.5 |
| | Entire thickness (mm) | 2.5 | 2.5 | 2.5 | 2.5 | 2.5 | 2.5 | 2.5 | 2.5 | 4.8 | 4.8 | 2.5 |
| | Unexpanded layer average thickness (mm) | 0.05 | None | 0.05 | 0.05 | 0.02 | 0.05 | None | 0.05 | 0.05 | None | 0.05 |

TABLE 1-continued

| | | Example | | | | | | | | Comparative Example | | Reference Example |
|---|---|---|---|---|---|---|---|---|---|---|---|---|
| | | 1 | 2 | 3 | 4 | 5 | 6 | 7 | 8 | 1 | 2 | |
| | Heated thickness swelling coefficient (%) | 21 | 17 | 23 | 11 | 17 | 29 | 21 | 31 | 2 | 0 | 2 |
| | Degree of crystallization (%) | 6 | — | — | 6 | — | 6 | — | — | 6 | — | 16 |
| | Amount of residual gas (% by weight) | 0.3 | — | 0.9 | 0.14 | — | 0.5 | — | 1.1 | 0.04 | — | 0.04 |
| | Amount of blended urea (% by weight) | — | 6.3 | — | — | 6.3 | — | 8.0 | — | — | 3.4 | — |
| Laminate | Temporary adhesive strength (N/cm$^2$) | 7 | 6 | 7 | 7 | 6 | 7 | 6 | 7 | 7 | 6 | 7 |
| Fiber-reinforced composite | Height (mm) | 18 | 18 | 18 | 18 | 18 | 18 | 18 | 18 | 18 | 18 | 18 |
| | Thickness T$_1$ of thinnest part (mm) | 2.00 | 2.00 | 2.00 | 1.60 | 2.00 | 2.50 | 2.50 | 2.50 | 1.90 | 1.90 | 1.10 |
| | Average thickness T$_{avg}$ of core material (mm) | 2.50 | 2.50 | 2.50 | 2.50 | 2.50 | 2.60 | 2.60 | 2.60 | 2.50 | 2.50 | 2.40 |
| | ½ × T$_{avg}$ (mm) | 1.25 | 1.25 | 1.25 | 1.25 | 1.25 | 1.30 | 1.30 | 1.30 | 1.25 | 1.25 | 1.20 |
| | Thickness T$_2$ of core material of highly-shaped section (mm) | 2.00 | 2.00 | 2.00 | 1.60 | 2.00 | 3.10 | 3.10 | 3.10 | 1.90 | 1.90 | 1.10 |
| | Radius of curvature of highly-shaped section surface (mm) | 13 | 13 | 13 | 13 | 13 | 13 | 13 | 13 | 13 | 13 | 13 |
| | Cell flatness ratio (%) | 60 | 90 | 70 | 60 | 90 | 70 | 90 | 80 | 17 | 17 | 50 |
| | Average thickness of unexpanded layer (mm) | 0.05 | None | 0.05 | 0.05 | 0.02 | 0.05 | None | 0.05 | 0.05 | None | 0.05 |
| | Apparent density of core material (g/cm$^3$) | 0.3 | 0.1 | 0.07 | 0.3 | 0.1 | 0.3 | 0.1 | 0.07 | 0.46 | 0.46 | 0.3 |
| | Degree of crystallization of core material (%) | 21 | — | — | 21 | — | 21 | — | — | 21 | — | 20 |
| | Compression strength per unit weight (kPa/g) | 610 | 720 | 690 | 560 | 770 | 650 | 780 | 740 | 370 | 430 | 310 |

From the aforementioned results, it is understood that a resin composite having superior strength can be obtained by the present invention.

EXPLANATION OF SYMBOLS

1: Expanded sheet
2: Fiber-reinforced resin material
3: Mold release film
41: Die (female die)
42: Die (male die)
43: Cavity
44: Expanded space section
A: Resin composite
A1: Core material
A2: Fiber-reinforced resin layer
B: Highly-shaped section
M: Pre-molded article

What is claimed is:

1. A resin composite comprising: a core material comprising a resin expanded body; and a fiber-reinforced resin material comprising a resin and fibers, a surface of said core material being covered by said fiber-reinforced resin material, wherein said core material is provided with a corner section, one site and another site in said surface adjoin each other at an inner angle of less than 180 degrees via said corner section, and said core material has a flatness ratio of cells of 20% or more from a surface of said corner section to a depth of 2.5 mm.

2. The resin composite according to claim 1, wherein said core material is a thermoformed expanded sheet and is provided with said corner section formed by said thermoforming, and a thickness of said corner section is greater than a thickness of the sites adjoining each other via said corner section.

3. The resin composite according to claim 2, wherein said expanded sheet is provided with a unexpanded layer on a surface layer.

4. The resin composite according to claim 1, wherein said core material is a bead expanded molded article.

5. A method for producing a resin composite, said method being for producing a resin composite comprising: a core material comprising a resin expanded body; and a fiber-reinforced resin material comprising a resin and fibers, a surface of said core material being covered by said fiber-reinforced resin material, wherein said core material of said produced resin composite is provided with a corner section, via which one site and another site adjoin each other in the surface at an inner angle of less than 180 degrees in a surface covered by said fiber-reinforced resin material, a first step of producing a pre-molded article by laminating said fiber-reinforced resin material on the surface of said core material and a second step of thermobonding said core material and said fiber-reinforced resin material by pressurizing with a molding die said pre-molded article in a heated state are carried out, a core material including a blowing agent in at least said sites becoming said corner section is used in the second step, and a size of cells in said sites of said core material is increased by said second step, and said core material has a flatness ratio of cells of 20% or more from a surface of said corner section to a depth of 2.5 mm.

* * * * *